United States Patent [19]

Bhattacharya et al.

[11] Patent Number: 4,646,442
[45] Date of Patent: Mar. 3, 1987

[54] LENGTH MEASUREMENT

[75] Inventors: Sabyasachi Bhattacharya; Clive R. E. Carroll, both of London, England

[73] Assignee: BICC Public Limited Company, London, England

[21] Appl. No.: 790,433

[22] Filed: Oct. 23, 1985

[30] Foreign Application Priority Data

Nov. 8, 1984 [GB] United Kingdom ............... 8428235

[51] Int. Cl.$^4$ .............................................. G01B 7/04
[52] U.S. Cl. .................................. 33/141 R; 33/142; 33/129
[58] Field of Search ............... 33/141 R, 125 M, 127, 33/129, 133, 141 B, 141 C, 141 D, 141.5, 142

[56] References Cited

U.S. PATENT DOCUMENTS

| 2,276,739 | 3/1942 | Rogers | 33/129 |
| 3,436,954 | 4/1969 | Eppler | 33/129 |
| 3,702,404 | 11/1972 | McDermitt | 33/127 |
| 3,739,276 | 6/1973 | Dornberger | 33/129 |
| 3,824,694 | 7/1974 | Lesperance et al. | |
| 4,041,610 | 8/1977 | Uesugi et al. | 33/127 |
| 4,052,599 | 10/1977 | Whiteley et al. | |
| 4,400,882 | 8/1983 | Thornton | 33/127 |

FOREIGN PATENT DOCUMENTS

| 111856 | 9/1979 | Japan | 33/141 R |
| 1555975 | 7/1976 | United Kingdom | |

Primary Examiner—Willis Little
Attorney, Agent, or Firm—Anthony J. Casella; Gerald E. Hespos

[57] ABSTRACT

Apparatus for measuring the length of a moving elongate element (1), such as a cable, comprises first and second rotative members (2), (3), rotatable by frictional contact with the element. The second member (3) responds to changes in the velocity of the element (1) to a differing extent to that of the first member (2). The rotation of each member is measured by detectors (11), (12), and data fed to a microprocessor (13) which compares the rotation of the two members to give an indication of the amount of slippage between one or both members and the element (1). The slippage is taken into account in determining the length of the moving element. The differing response to changes in velocity can be achieved by the second member (3) being of a different inertia to that of the first member (2). Alternatively the members frictionally contact the element to a different extent.

11 Claims, 1 Drawing Figure

U.S. Patent  Mar. 3, 1987  4,646,442
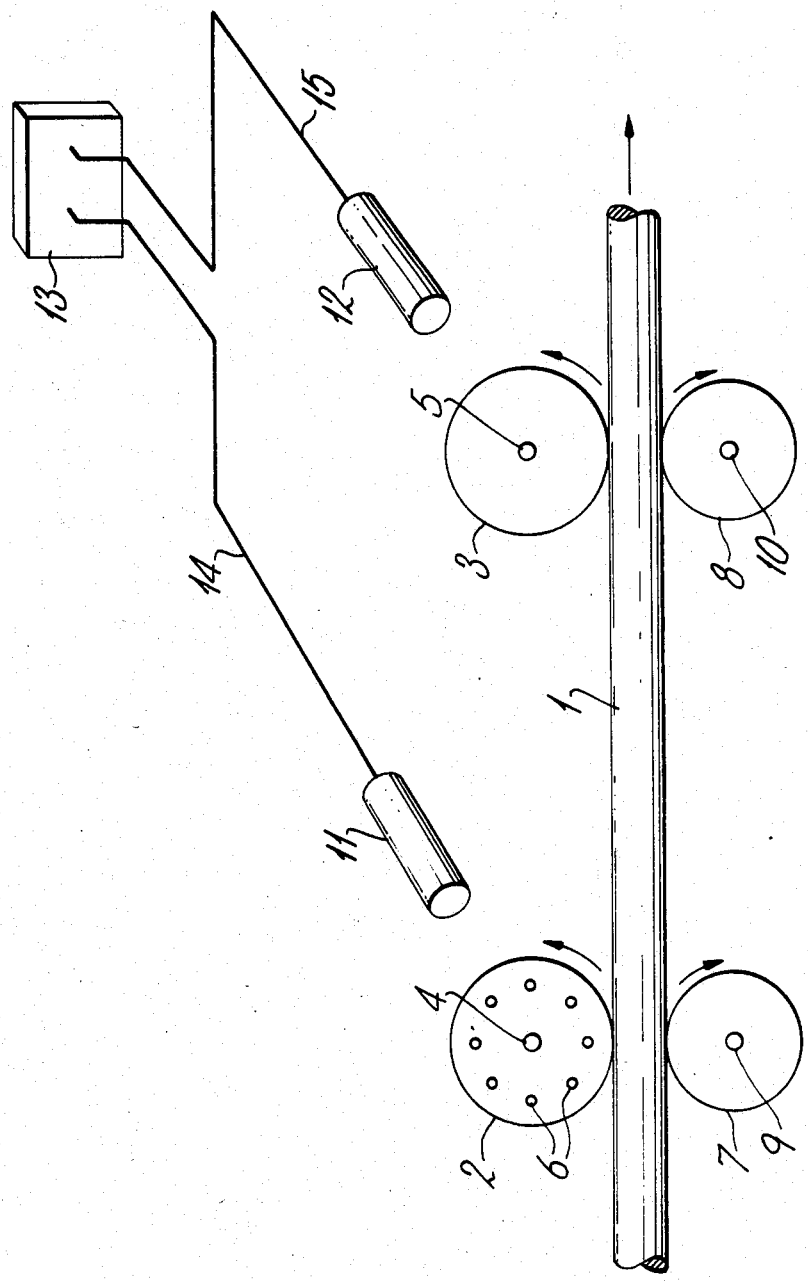

LENGTH MEASUREMENT

BACKGROUND OF THE INVENTION

This invention relates to apparatus for determining the length of a moving elongate element. The invention is particularly, but not exclusively suitable for measuring the length of electric cables, conductors etc., but the generic term elongate element is herein meant to include flat sheet like items such as paper or metal.

Known techniques of length measurement for moving items can be defined as either contact or non-contact techniques. Contact methods consist of providing some moveable member, usually a wheel or other roller, which contacts the element as it moves. Movement of the elongate element causes corresponding movement of the roller which can be detected to give an indication of the length of the element. During movement of the element however, it is common for there to be slippage between the contacting roller and the element, thereby giving a false indication of its length. Attempts to prevent slippage in contact systems have never been entirely successful.

Non-contact methods such as laser anemometry avoid the problem of slippage but are relatively expensive. It is an object of the present invention to provide a contact technique which is less prone to false measurement due to slippage.

SUMMARY OF THE INVENTION

Accordingly there is a provided apparatus for determining the length of a moving elongate element comprising at least first and second rotative members, each adapted frictionally to contact the elongate element so as to be generally rotated by longitudinal movement thereof, the second member being adapted to respond to changes in the velocity of the element to a differing extent from that of the first member; means for measuring the rotation of each member; and electronic processing means adapted to receive data from the measuring means and to compare the rotation of the first and second members to give an indication of the amount of slippage between one or both members and the elongate element thereby to calculate from the measured rotation of one or both members, and the indication of the amount of slippage, the length of the elongate element.

Preferably, the differing extent to which the first and second members respond to changes in velocity of the element is achieved by the second member being of a different inertia from that of the first member.

As the inertia of the first and second members is different, slippage of each member with respect to the elongate element will result in different amounts of rotation for each of the members. The electronic processing means can be calibrated to interpret the difference in rotation in terms of slippage at one or both of the members.

Preferably the first member is of a substantially equal diameter to the second member. The inertia of the first and second members is therefore preferably made different by the members being of different mass. In one arrangement the inertia of one member is made different to the other member by the two members being formed of different materials. Alternatively one member is provided with recessed portions regularly distributed about the centre of the member. Conceivably there are provided weights received in the recessed portions to increase the mass of the said one member. In yet another arrangement one member is of a different width to that of the other member.

Each of the first and second members is preferably provided with a pressure member adapted to engage the opposite face of the elongate element so as to urge it into contact with the first and second members.

As an alternative to the inertia of one member being different from that of the other, the first and second members are each adapted frictionally to contact the elongate element to a different extent. In one embodiment of the invention the first and second members are adapted to engage the elongate element such that the normal force between one of the members and the element is different from the normal force between the other of the members and the element. In an alternative embodiment the first and second members are such that the surface adapted to contact the elongate element of one of the members is different from the surface adapted to contact the elongate element of the other of the members. In both of the above described embodiments slippage of one of the members will occur more readily than slippage of the other member, thereby producing a difference in the amount of rotation of one member relative to the other. The electronic processing means interprets this difference in terms of the amount of slippage occurring.

Conveniently the means for measuring the rotation of each member comprises a disc, the rotation of which is proportional to the rotation of the member, the disc being provided with markings, and a detector adapted to detect said markings to determine the rotation of the member. The detector conveniently comprises an energy source and an energy responsive element and the markings on the disc are apertures therein. Alternatively the detector comprises a magnetoresponsive element and the markings on the disc are strips of electrically conducting material.

Other devices for measuring the rotation of the members such as encoders employing interference techniques are readily available and will be known to those skilled in the art.

The rotative members are conveniently rollers. Alternatively wheels or discs may be employed.

The invention further relates to a method of determining the length of a moving elongate element employing apparatus as described herein. In particular a method of determining the length of a moving elongate element comprises frictionally contacting the element with at least first and second rotative member such that the members are generally rotated by longitudinal movement thereof, the second member being adapted to respond to changes in the velocity of the element to a differing extent from that of the first member, measuring the rotation of each member, comparing the rotation of the first and second members, interpreting any difference in the rotation of the first and second members as an indication of the amount of slippage between the members and the elongate element and calculating from the rotation of either or both members and the indication of the amount of slippage, the length of the elongate element.

BRIEF DESCRIPTION OF THE DRAWING

One embodiment of the invention will now be further described, by way of example only, with reference to the accompanying drawing which is a schematic diagram of length measuring apparatus according to the invention.

DETAILED DESCRIPTION OF THE PREFERRED EMBODIMENTS

According to the drawing an elongate element in the form of a cable 1 is moved in the direction of the arrow by driving means (not shown). In frictional contact with the cable 1 is a first rotative member in the form of a wheel 2 and a second member in the form of wheel 3. Wheels 2 and 3 are rotatably mounted on axles 4 and 5 respectively. The wheels are of a substantially similar diameter, have substantially the same width and, in the illustrated embodiment, preferably are formed from the same metallic material. Wheel 2 is of a lesser mass as it is provided with drilled apertures 6. Pressure rollers 7 and 8, mounted on axles 9 and 10 respectively urge the cable 1 into frictional contact with the wheels 2 and 3. Rollers 7 and 8 are resiliently mounted so that the wheels 2 and 3 exert substantially the same normal reaction force on the cable 1.

Detectors 11 and 12 detect rotation of the wheels 2 and 3 and produce electronic signals which are fed to electronic processing means such as a micro-processor 13 via lines 14 and 15.

As the cable 1 moves past the wheels 2 and 3, the wheels are rotated. Detectors 11 and 12 detect the rotation and pass signals to the micro-processor 13 which makes calculations of the length of cable dispensed. The position will now be considered in which the cable 1 moves irregularly, for example a momentary rapid deceleration of the cable. Wheels 2 and 3, which were rotating at the speed at which the cable was previously moving, cannot instantaneously adjust to the new speed of the cable and will run on, slipping over the surface of the cable.

Wheel 3, being of a larger mass than wheel 2 and hence having a greater inertia, will run on further than wheel 2. Hence the rotation of wheel 3 as detected by detector 12 will be greater than the rotation of wheel 2 as detected by detector 11. Micro-processor 13 compares the data from the two detectors to produce an error signal representative of the difference in rotation of wheel 2 and wheel 3. The micro-processor can be calibrated to interpret this error signal in terms of an amount of slippage at wheels 2 and 3 and can accordingly adjust its calculations of the length of cable dispensed.

As an alternative to the previously described structure, the wheels 2 and 3 may be formed from different materials such that wheel 2 exhibits a first set of frictional characteristics while wheel 3 exhibits a second and distinct set of frictional characteristics. With this embodiment, as explained previously, the different frictional characteristics will cause wheels 2 and 3 to react differently to changes in speed of the cable 1 moving relative thereto.

We claim:

1. An apparatus for determining the length of a longitudinally moving elongate element comprising:
    first and second rotative members rotatably mounted in frictional contact with the elongate element such that the longitudinal movement of said elongate element causes rotation of said first and second rotative members, and such that changes in the rate of movement of said elongate element cause said first and second rotative members to slip relative to said elongate element, said first rotative member being structurally distinct from said second rotative member such that said first and second rotative members slip different amounts in response to changes in the rate of movement of the elongate element;
    measuring means for measuring the respective rotations of said first and second rotative members; and
    electronic processing means operatively connected to said measuring means for determining the differences in slippage between said first and second rotative members relative to said elongate element and for accurately determining the length of said elongate element based on the total measured rotations and the determined differences of slippage.

2. An apparatus as in claim 1 wherein the structural distinction between said first and second rotative members gives said first and second rotative members different rotational inertia relative to each other.

3. An apparatus as in claim 2 wherein the first and second rotative members are of substantially equal diameters.

4. An apparatus as in claim 2 wherein the first and second rotative members are structurally distinct in that the first rotative member is of greater mass than the second rotative member.

5. An apparatus as in claim 4 wherein the first and second rotative members are formed of different materials.

6. An apparatus as in claim 4 wherein the first rotative member is provided with recessed portions regularly disposed about its center.

7. An apparatus as in claim 1 further comprising first and second pressure members disposed in rolling contact with the elongate element and on the side thereof generally opposite the first and second rotative members respectively, said first and second pressure members being operative to urge the elongate element into contact with the first and second rotative members.

8. An apparatus as in claim 1 wherein the first and second rotative members are structurally distinct from one another such that said first and second rotative members exhibit different frictional characteristics relative to said elongate element.

9. An apparatus as in claim 8 wherein the surface of said first rotative member provides a contact area with the elongate element that is greater than the contact area of the second rotative member therewith, said different contact areas providing the different frictional characteristics of said first and second rotative members relative to said elongate element.

10. An apparatus as in claim 8 wherein said first and second rotative members are structurally distinct in that the first rotative member exerts a normal force on the elongate element greater than the normal force exerted by the second rotative member.

11. A method of determining the length of an elongate element comprising the steps of:
    providing a first rotative member rotatably mounted in frictional contact with the elongate element such that movement of the elongate element causes rotation of the rotative member and such that changes in speed of the elongate element effect slippage between the elongate element and the first rotative member;
    providing a second rotative member rotatably mounted in frictional contact with the elongate element such that movement of the elongate element causes rotation of the second rotative member and such that changes in the speed of the elongate element causes slippage of the second rotative member relative to the elongate member, said second rotative member being structurally distinct from said first rotative member so as to exhibit different slippage than the first rotative member in response to changes in speed of said elongate member;

moving the elongate element relative to the first and second rotative members;

measuring the rotation of both the first and second rotative members;

determining the differences between the rotation of the first and second rotative members;

calculating the slippages of the first and second rotating members relative to the elongate element based upon the determined differences in rotation between the first and second members; and calculating the length of the elongate element based on the measured rotation and the calculated slippage.

* * * * *